United States Patent [19]

Jones, Jr. et al.

[11] 3,831,151

[45] Aug. 20, 1974

[54] SENSE LINE PROCESSOR WITH PRIORITY INTERRUPT ARRANGEMENT FOR DATA PROCESSING SYSTEMS

[75] Inventors: Leo V. Jones, Jr., Chicago; Paul A. Zelinski, Elmhurst, both of Ill.

[73] Assignee: GTE Automatic Electric Laboratories Incorporated, Northlake, Ill.

[22] Filed: Apr. 4, 1973

[21] Appl. No.: 347,966

[52] U.S. Cl. .......... 340/172.5
[51] Int. Cl. .......... G06f 9/18
[58] Field of Search .......... 340/172.5

[56] References Cited

UNITED STATES PATENTS

| | | | |
|---|---|---|---|
| 3,286,239 | 11/1966 | Thompson et al. | 340/172.5 |
| 3,534,339 | 10/1970 | Rosenblatt | 340/172.5 |
| 3,568,157 | 3/1971 | Downing | 340/172.5 |
| 3,643,218 | 2/1972 | Cramwinckel | 340/172.5 |
| 3,699,530 | 10/1972 | Capowski | 340/172.5 |
| 3,701,109 | 10/1972 | Peters | 340/172.5 |
| 3,702,462 | 11/1972 | England | 340/172.5 |
| 3,711,835 | 1/1973 | Jaeger et al. | 340/172.5 |
| 3,735,357 | 5/1973 | Maholick et al. | 340/172.5 |

*Primary Examiner*—Raulfe B. Zache
*Assistant Examiner*—James D. Thomas

[57] ABSTRACT

An interrupt block circuit uses hardware to scan interrupt leads during every instruction, with a station for every interrupt level, organized in blocks of four stations each, with the scan proceeding through all blocks in parallel, and then through the blocks in sequence, thereby reducing the scan time compared to sequential scanning of all stations in sequence. All interrupt leads having true signals set a WAIT latch in their station and when selected by the scan set an ACTIVE latch. There is also a branch return scan to reset the highest level ACTIVE latch that has been set. Any number of sense leads may be merged for each interrupt priority level. The software selects the sense lead that is true after an interrupt. The interrupt block circuit is part of a computer line processor for processing sense leads, and merging them by selection of a group. In a duplicated system a computer line synchronizer will sync hold circuits to ensure that the signals appear at the same time to the duplicated computers which are operating in synchronization.

18 Claims, 12 Drawing Figures

COMPUTER LINE PROCESSOR-CLP

COMPUTER LINE SYNCHRONIZER CLS-A

PATENTED AUG 20 1974 3,831,151

SHEET 07 OF 11

COMPUTER SENSE LINE CIRCUIT-CSL

COMPUTER LINE PROCESSOR INTERFACES

COMPUTER CENTRAL PROCESSOR CCP

SENSE LINE PROCESSOR WITH PRIORITY INTERRUPT ARRANGEMENT FOR DATA PROCESSING SYSTEMS

BACKGROUND OF THE INVENTION

1. Field of the Invention

This invention relates to a sense line processor with a priority interrupt arrangement for data processing systems; and more particularly to a computer sense line processor for a communication switching system with stored program control, in which sense lines from subsystems such as markers, register-senders, and the computer itself indicate requests for action to be taken by the computer.

2. Prior Art

There are many known priority interrupt arrangements. See for example U.S. Pat. Nos. 3,221,309 by R. Benghiat issued Nov. 30, 1965, 3,611,305 by L. E. Greenspan issued Oct. 5, 1969, and 3,643,229 by T. D. Stuebe et al issued Feb. 15, 1972.

SUMMARY OF THE INVENTION

The object of this invention is to provide a priority interrupt arrangement which permits a large number of interrupt priority levels to be scanned within the time for the execution of one instruction.

According to the invention, an interrupt block circuit is arranged to scan a number of blocks in parallel, each block having a given number of block stations, each station being for one interrupt level. The scan time is thus reduced to the time required to scan through one block, plus the time required to scan the blocks.

Further features relate to signal lockout, inhibit of interrupts, synchronization, maintenance of a duplicated system, and others as set forth in the description of the preferred embodiment.

CROSS-REFERENCES TO RELATED APPLICATIONS

The preferred embodiment of the invention is incorporated in a COMMUNICATION SWITCHING SYSTEM WITH MARKER, REGISTER AND OTHER SUBSYSTEMS COORDINATED BY A STORED PROGRAM CENTRAL PROCESSOR, U.S. Pat. application Ser. No. 130,133 filed Apr. 1, 1971 by K. E. Prescher, R. E. Schauer and F. B. Sikorski, and a continuation-in-part thereof Ser. No. 342,323, filed Mar. 19, 1973, hereinafter referred to as the SYSTEM application. The system may also be referred to as No. 1 EAX or simply EAX.

The memory access, and the priority and interrupt circuits for the register-sender subsystem are covered by U.S. patent application Ser. No. 139,480 filed May 3, 1971 now Pat. No. 3,729,715 issued May 31, 1973 by C. K. Buedel for a MEMORY ACCESS APPARATUS PROVIDING CYCLIC SEQUENTIAL ACCESS BY A REGISTER SUBSYSTEM AND RANDOM ACCESS BY A MAIN PROCESSOR IN A COMMUNICATION SWITCHING SYSTEM, hereinafter referred to as the REGISTER-SENDER MEMORY CONTROL patent application. The register-sender subsystem is described in U.S. Pat. application Ser. No. 201,851 filed Nov. 24, 1971 now Pat. No. 3,737,873 issued June 5, 1973 by S. E. Puccini for DATA PROCESSOR WITH CYCLIC SEQUENTIAL ACCESS TO MULTIPLEXED LOGIC AND MEMORY, hereinafter referred to as the REGISTER-SENDER patent application. Maintenance hardware features of the register-sender are described in four U.S. Pat. applications having the same disclosure filed July 12, 1972, Serial No. 270,909 now Pat. No. 3,784,801 issued Jan. 8, 1974 by J. P. Caputo and F. A. Weber for a DATA HANDLING SYSTEM ERROR AND FAULT DETECTING AND DISCRIMINATING MAINTENANCE ARRANGEMENT, Serial No. 270,910 now Pat. No. 3,783,255 issued Jan. 1, 1974 by C. K. Buedel and J. P. Caputo for a DATA HANDLING SYSTEM MAINTENANCE ARRANGEMENT FOR PROCESSING SYSTEM TROUBLE CONDITIONS, Ser. No. 270,912 by C. K. Buedel and J. P. Caputo for a DATA HANDLING SYSTEM MAINTENANCE ARRANGEMENT FOR PROCESSING SYSTEM FAULT CONDITIONS, and Ser. No. 270,916 now Pat. No. 3,783,255 issued Jan. 1, 1974 by J. P. Caputo and G. O'Toole for a DATA HANDLING SYSTEM MAINTENANCE ARRANGEMENT FOR CHECKING SIGNALS, these four applications being referred to hereinafter as the REGISTER-SENDER MAINTENANCE patent applications.

The marker for the system is disclosed in the U.S. Pat. No. 3,681,537, issued Aug. 1, 1972 by J. W. Eddy, H. G. Fitch, W. F. Mui and A. M. Valente for a MARKER FOR COMMUNICATION SWITCHING SYSTEM, and No. 3,678,208, issued July 18, 1972 by J. W. Eddy for a MARKER PATH FINDING ARRANGEMENT INCLUDING IMMEDIATE RING; and also in U.S. Pat. applications Ser. No. 281,586 filed Aug. 17, 1972 by J. W. Eddy for an INTERLOCK ARRANGEMENT FOR A COMMUNICATION SWITCHING SYSTEM, Ser. No. 311,606 filed Dec. 4, 1972 by J. W. Eddy and S. E. Puccini for a COMMUNICATION SYSTEM CONTROL TRANSFER ARRANGEMENT, Ser. No. 303,157 filed Nov. 2, 1972 by J. W. Eddy and S. E. Puccini for a COMMUNICATION SWITCHING SYSTEM INTERLOCK ARRANGEMENT, hereinafter referred to as the MARKER patents and applications.

The communication register and the marker transceivers are described in U.S. Pat. application Ser. No. 320,412 filed Jan. 2, 1973 by J. J. Vrba and C. K. Buedel for a COMMUNICATION SWITCHING SYSTEM TRANSCEIVER ARRANGEMENT FOR SERIAL TRANSMISSION, hereinafter referred to as the COMMUNICATIONS REGISTER patent application.

The above system, register-sender, marker and communication register patents and applications are incorporated herein and made a part hereof as though fully set forth.

DESCRIPTION OF THE PREFERRED EMBODIMENT

Priority Interrupt

Figure 1:
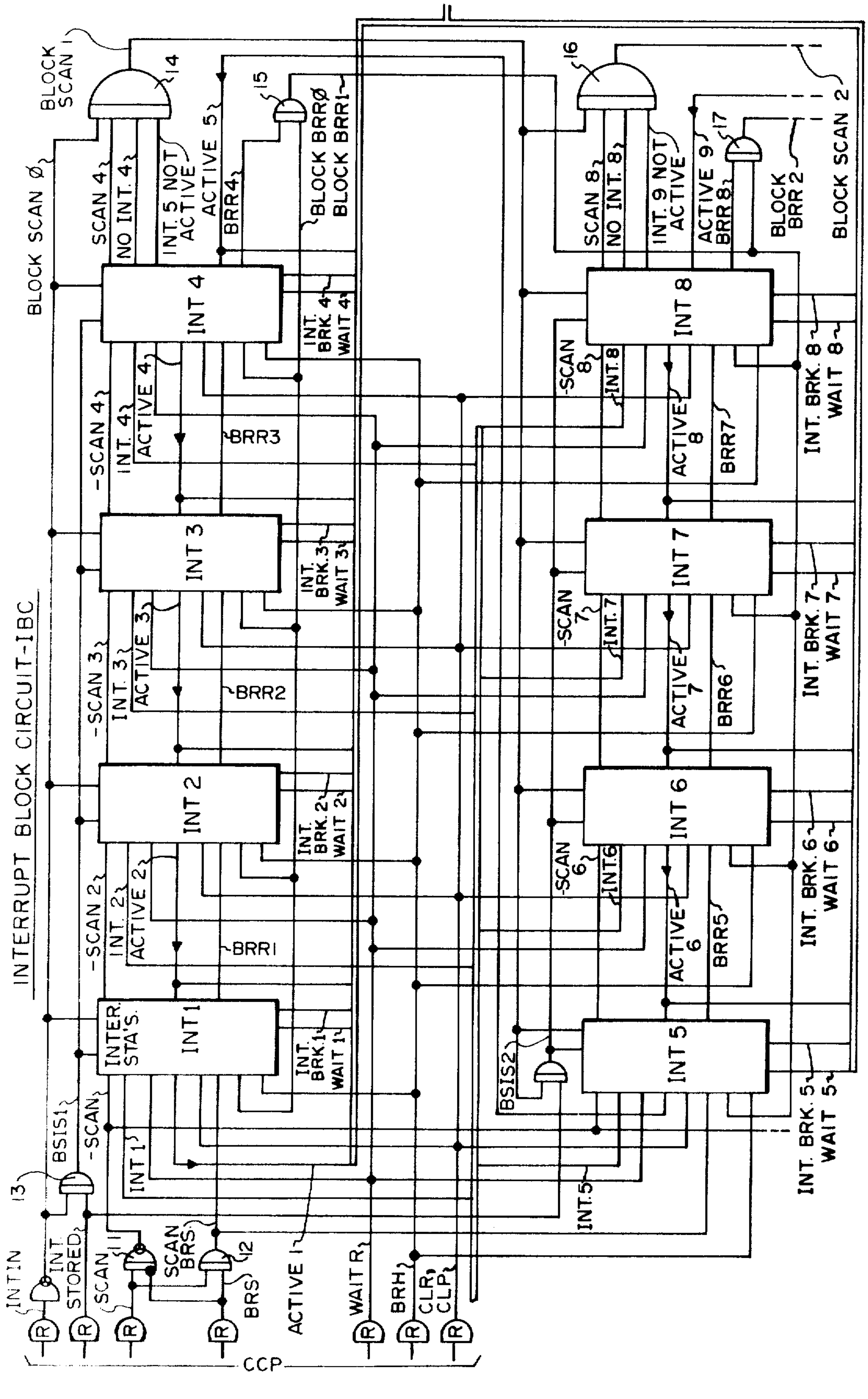
FIG. 1 is a functional block diagram of an interrupt block circuit.

The interrupt block circuit IBC shown in FIG. 1 comprises a number of interrupt blocks or cards, with four interrupt stations in each block. Each station handles one level of priority. The first block comprises stations INT1-INT4, and the second block comprises stations INT5-INT8. It is possible to have 32 blocks, for a total of 128 levels of interrupt.

Figure 2:
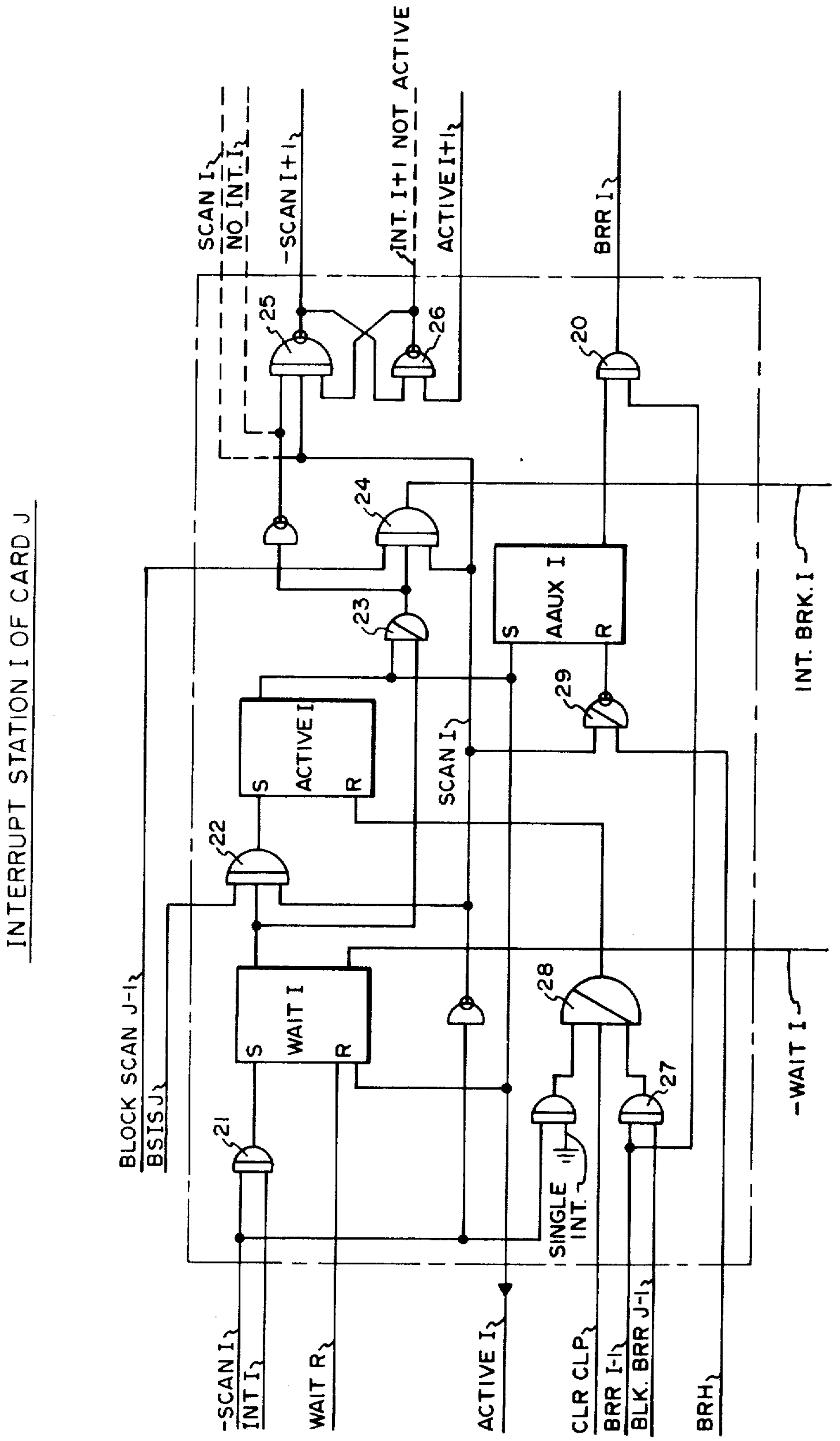
FIG. 2 is a functional block diagram of an individual interrupt station of FIG. 1.

The circuit of an individual station I of card or block J is shown in FIG. 2. The function of each station is to accept pre-defined signals and store them. When stored the station initiates an interrupt break signal. This storage of the signal and initiating of an interrupt break is dependent upon the presence or absence of a scan signal. The scan signal is a synchronized level from a computer central processor that is allowed to propagate through the four stations beginning at the first station through the last. The absence of a scan signal allows a storage element WAIT I to be set to store an interrupt signal at each of the stations should one be present. The signal on lead -SCAN I is true, and if the interrupt signal on lead INT I becomes true, latch WAIT I is set via gate 21.

As shown in FIG. 1, several control signals are received from the computer central processor CCP via cable terminating in receivers R. The signal SCAN via NAND gate 11 supplies a signal on lead -SCAN to the lead -SCAN I of the first station of every block.

As the scan level is initiated it arrives at the first station, should the WAIT latch be set, and there are no interrupt signals of a higher priority, it will initiate an interrupt break, and the scan will be inhibited from traveling to the succeeding station. The interrupt break signal is supplied from gate 24 to lead INT BRK I. During the scan level the signal on lead BLOCK SCAN J-1 is normally true, as is the signal on lead SCAN I. Then if either latch WAIT I or ACTIVE I is set, the signal via OR gate 23 enables gate 24 to make its output true. The signal from gate 23 via an inverter also inhibits NAND gate 25 to prevent the scan from propagating to the succeeding station.

Thus coincidence of the WAIT latch set and the SCAN signal in a station will form up the signal INT BRK. At this point therefore the station will contain a WAIT state stored, a SCAN signal and an INT BRK. The succeeding stations may or may not have their WAIT states set, but there will be no SCAN at those stations.

Should the SCAN find that the WAIT state is not set, and should the ACTIVE latch of the next succeeding station be reset, the scan will propagate to that station and process it in the same manner.

Thus if no ACTIVE latches or WAIT latches are set in any of the four stations the scan will propagate through the block and out. An additional requirement for scan propagation through a station is that a signal on lead BLOCK SCAN J-1 be true.

The central processor may supply a signal on lead INT STORED. This signal is an input of gate 13 in the first block, and a similar gate for each of the other blocks. In each block, if the signal on lead BLOCK SCAN J-1 is true, a block scan, interrupt stored signal is supplied to all stations of the block. In the first block this is the signal on lead BSIS1. This signal at gate 22 of a station having the WAIT state true along with the SCAN being true at that station, will set the latch ACTIVE I of the station. Setting of the ACTIVE latch will reset the WAIT latch at that station. With a SCAN signal present either the WAIT state or the ACTIVE state true will continue to form up the signal on lead INT BRK. The removal of the signal SCAN I will take away the INT BRK I signal. As long as the station's ACTIVE latch is set, another SCAN signal cannot enter that station.

So that the highest acting interrupt of a block can be reset while not resetting any other, a separate scanning system is involved. A signal BRS (branch return scan) via gate 12 in coincidence with the signal SCAN from the central processor supplies a signal on lead SCAN BRS to the input BRR I-1 of the first station of every block. The signal BRS also inhibits the regular scan via gate 11. The signal is propagated to the next station via gate 20 and lead BRRI. When the ACTIVE latch of a station is set, its output also sets an auxiliary active latch AAUX I. This latch is used to block further propagation of the branch return scan by inhibiting gate 20 with its 0 output. If a signal on lead BLK BRR J-1 is true, the BRS scan resets the first ACTIVE latch and does not propagate further. The AAUX latch is not reset at this time, but is reset when the instruction used to reset the ACTIVE latch no longer exists by the signal on lead BRH (branch return hold) being not true, when there is no scan, via NOR gate 29.

A signal on a lead SINGLE INT may also be used to reset the ACTIVE latch when there is no scan, but this lead is not used in the present system and so is shown at ground potential, which is a 0 level.

The outputs from the last station of each block differs slightly from the others as shown by dotted lines in FIG. 2. The signal SCAN I is extended as an output, the signal on lead NO INT I is the inverted output of gate 23, and the signal on lead INT I+1 NOT ACTIVE is the output of gate 26 used in all stations to inhibit gate 25. These three leads along with lead BLOCK SCAN J-1 are used as inputs of an AND gate to propagate the scan down the set of blocks. For example gate 14 for block 1 supplies a true signal on lead BLOCK SCAN 1 if there are no interrupts in block 1, the ACTIVE latch in station 5 is not set and BLOCK SCAN $\phi$ is true. A signal on lead INTIN may be supplied from the central processor to inhibit all interrupts, but this signal is normally a $\phi$ so that its inversion on lead BLOCK SCAN $\phi$ is true. If there are no interrupts in any block, the three signals from the last station of each block are true as soon as the scan has propagated through the four stations. Then the true signal on lead BLOCK SCAN $\phi$ propagates through gate 14 of block 1, gate 16 of block 2, and so on through all of the blocks. If 32 blocks were implemented, the total scan time would be equal to 32 +4 or 36 levels; rather than 128 sequential levels. This permits the scan to be completed within one instruction (2 microseconds). Note that gate 14 is actually a NAND gate followed by an inverter to achieve the AND function, and that the propagation of the scan through a station likewise involves an inverter and a NAND gate.

The propagation of the branch return scan also proceeds through all blocks in parallel through the four stations of each, and then from block to block starting with block 1. There is no actual input connection to lead BLOCK BRRϕ, which is the same as being true. After the parallel scan of the blocks without being inhibited at gate 20 of any station, the signals BRR4, BRR8, etc. are true; and then the true signal from lead BLOCK BRRϕ propagates through gates 15, 17, etc. of all blocks until it reaches a block in which BRR I from the last station is not true. In that block it enables gate 27 of the station having BRR I-1 true. Note that gate 20 of each station is also actually a NAND gate followed by an inverter. In addition gate 15 does not actually exist as a separate gate, but instead gate 20 of station INT 4 has three inputs, -AAUXI, BRR3, and BLK BRR ϕ; and similarly gate 20 of the last station of every block has three inputs.

The computer central processor may supply a signal WAIT R to reset the WAIT latches of all stations, and a signal CLR CLP to reset all ACTIVE latches.

Figure 3:
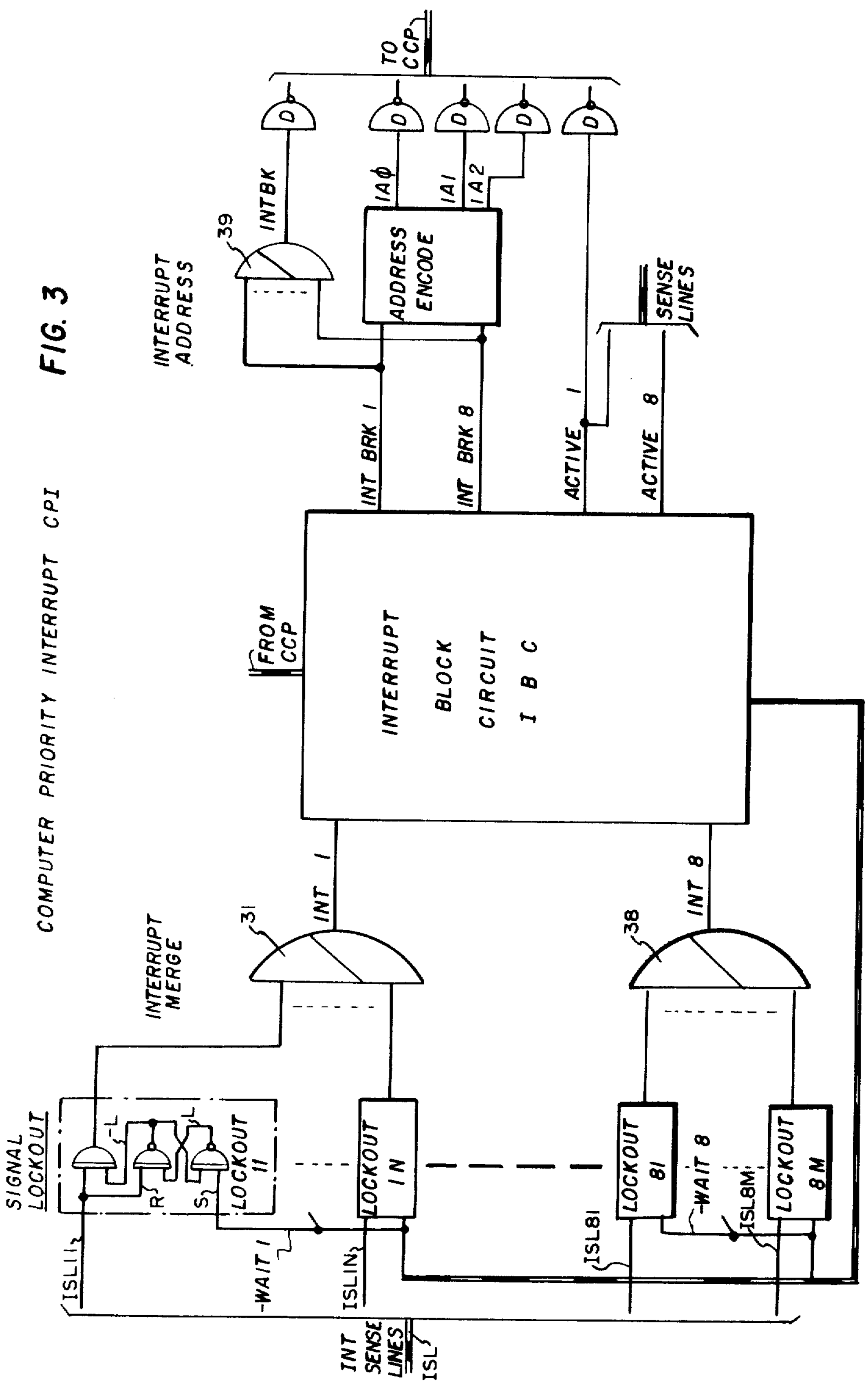
FIG. 3 is a block diagram of a computer priority interrupt unit incorporating the interrupt block circuit of FIG. 1.

Referring to FIG. 3, the interrupt block circuit IBC is part of a computer priority interrupt arrangement CPI. In this unit there are only eight interrupt levels used, so that circuit IBC has only eight stations. The input of unit CPI comprises sense lines from various other units requesting action from the computer by the interrupt method. These interrupt sense lines are designated as ISL11 to ISL8M. Each interrupt sense line is assigned to one of the eight interrupt priority levels. There may be any number of sense lines for each level.

There is a signal lockout circuit for each interrupt sense line. Each lockout circuit comprises three NAND gates, but in FIG. 3, the upper gate is shown as an AND gate. The other two gates form a latch. This is a common form of storage element used in the system. Normally both inputs are at the 1 level, one output is 1, and the other output is 0. The inputs may be designated S and R, and a 0 at an input causes the corresponding output to be 1 and the other to be 0. For convenience when a latch is shown as a block as in FIG. 2, it is represented that a 1 at an input is effective to produce a 1 at the corresponding output, which implies an inverter within the box for each input. If there are a plurality of leads at an input, they provide an OR function.

The signal lockout circuit is used to permit the interrupt circuits to respond only once to an interrupt sense line signal which may remain true for an extended time. When the interrupt block circuit has acted on the signal by setting the WAIT I latch, the signal condition -WAIT I is at the 0 level to set the lockout latch at the lower input. The output -L is then a 0 which inhibits the AND gate and thus terminates the output. When the interrupt sense line signal returns to 0 it resets the lockout latch at its R input. Thus once there is a response to an interrupt sense line signal, the interrupt circuits do not have to be concerned with it until it has been removed and reinitiated.

Interrupt merge circuits comprise a set of gates providing an OR function for each interrupt priority level. These gates are shown in FIG. 3 as eight OR gates 31–38, whose outputs are the interrupt signals INT 1-INT 8 to the interrupt block circuit IBC.

When the interrupt block circuit has formed one of the interrupt break outputs, an OR function shown as gate 39 supplies a signal INTBK. An address is encoded on the three address leads IAϕ, IA1 and IA2 according to which one of the eight signals INT BRK 1 to INT BRK 8 is true. The INTBK, address, and ACTIVE I signals are supplied via cable to the central processor CCP. The leads ACTIVE 1 - ACTIVE 8 are connected as sense lines as shown in FIG. 4.

Computer Line Processor

Figure 4:
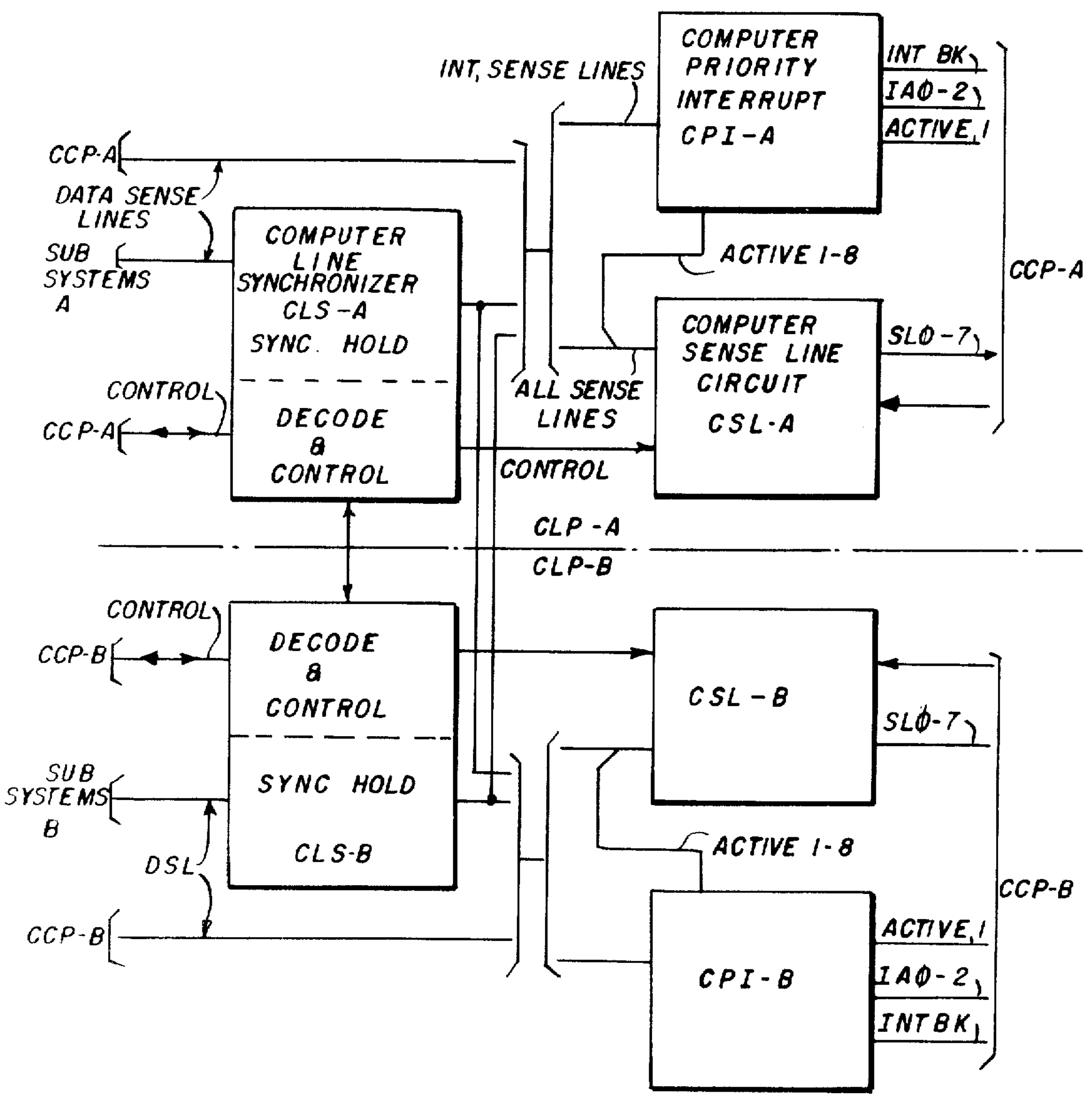
FIG. 4 is a block diagram of a computer line processor incorporating the priority interrupt unit of FIG. 1, with duplication.
Figure 5:
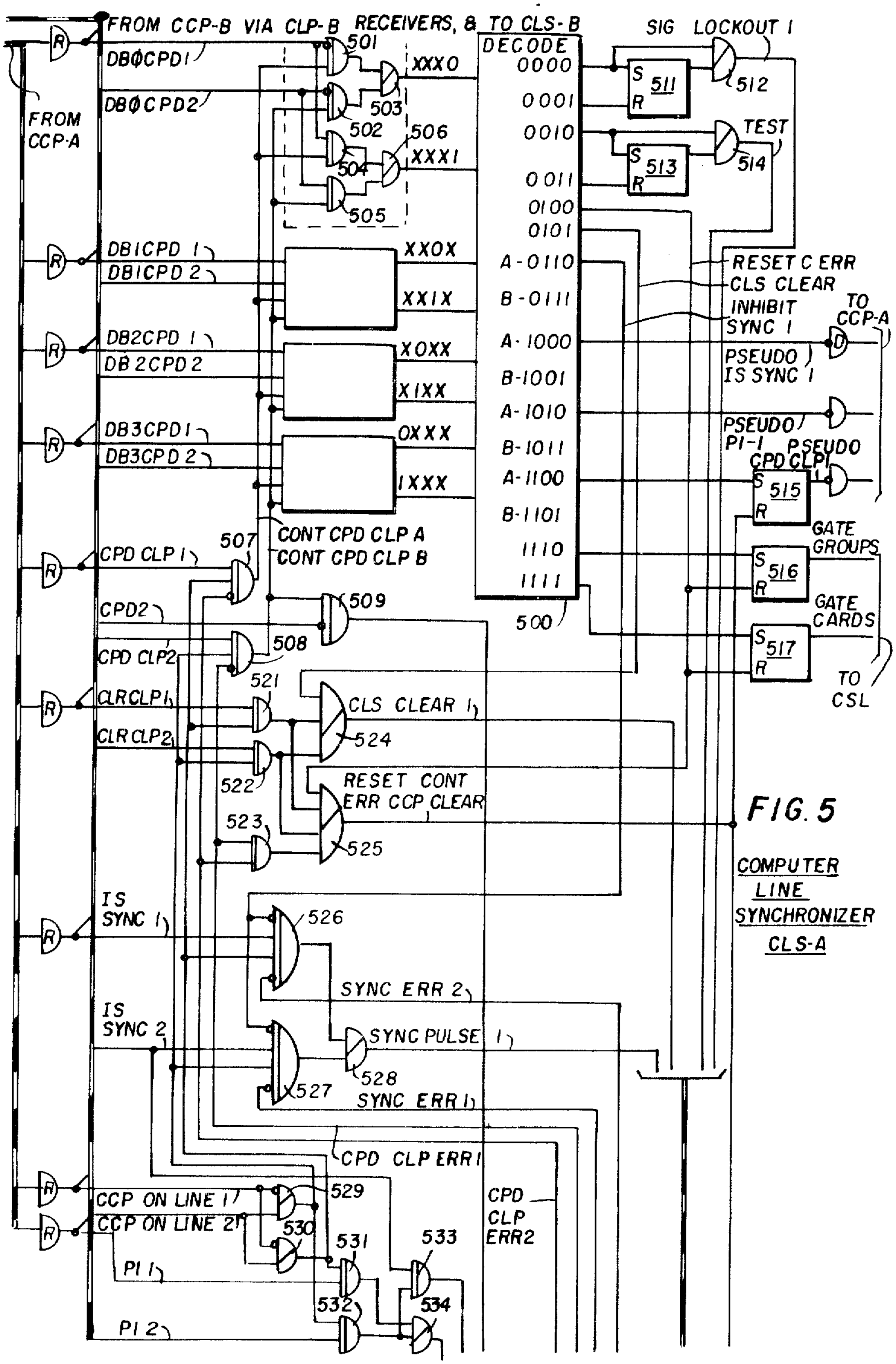
FIGS. 5 and 5A arranged as shown in FIG. 5B comprise a functional block diagram of a computer line synchronizer used in the line processor of FIG. 4.
Figures 5A, 5B:
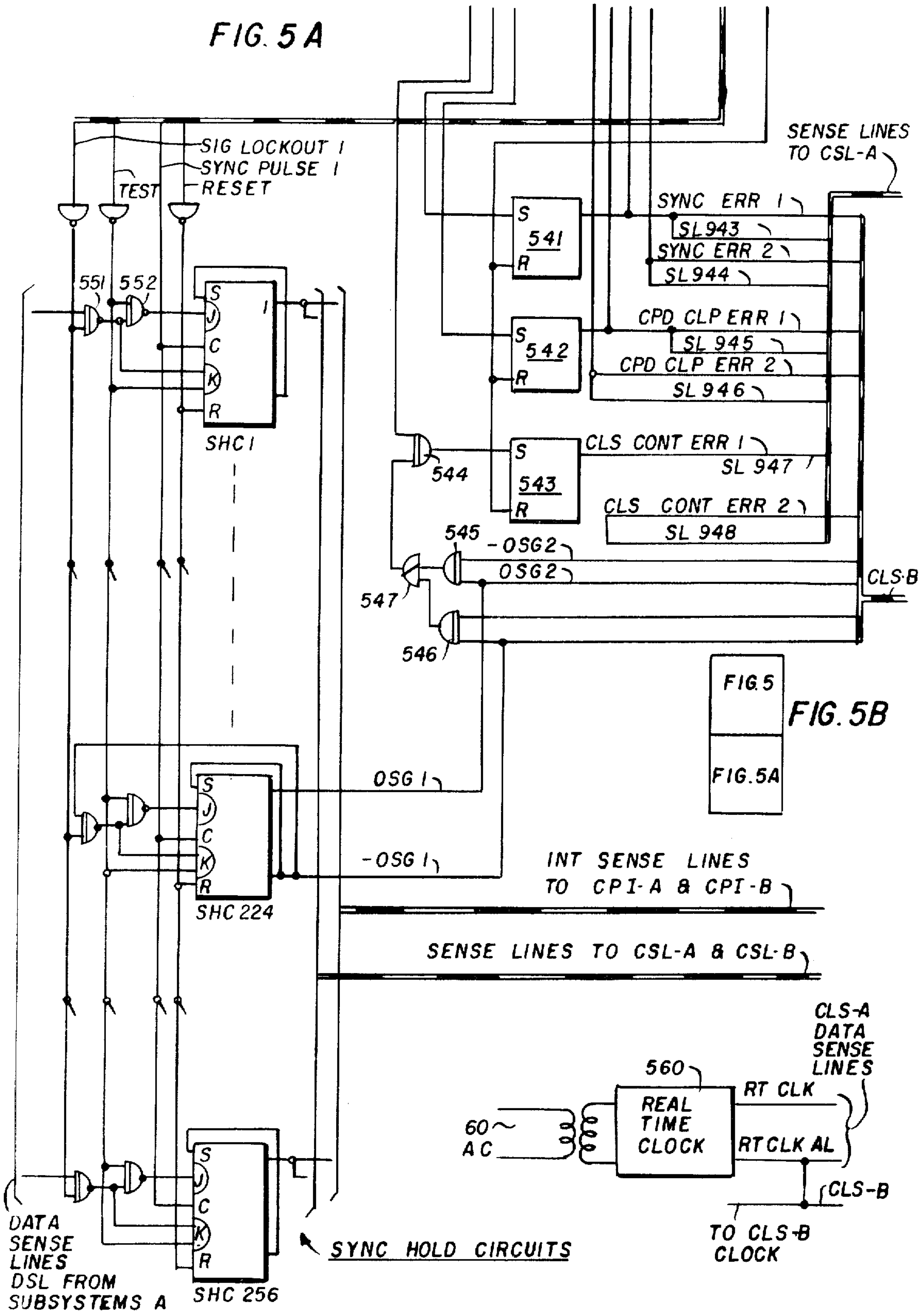
Figure 6:
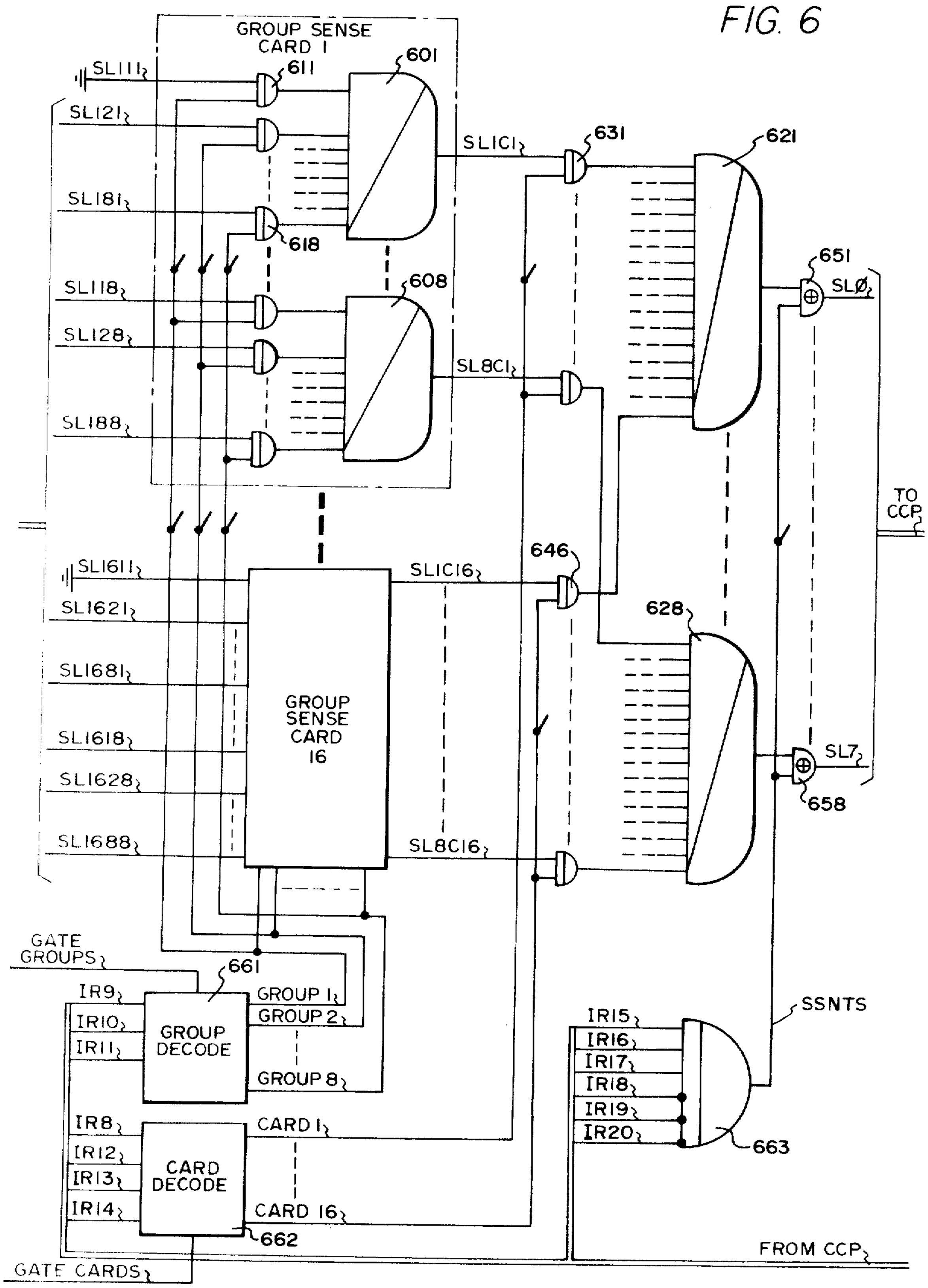
FIG. 6 is a functional block diagram of a computer sense line circuit used in the line processor of FIG. 4.

Referring to FIG. 4, the computer priority interrupt unit CPI is part of a computer line processor CLP, which also includes a computer line synchronizer CLS (FIGS. 5 and 5A) and a computer sense line circuit CSL (FIG. 6). These circuits are duplicated as A and B circuits associated with the respective computer central processors CCP-A and CCP-B.

Figure 7:
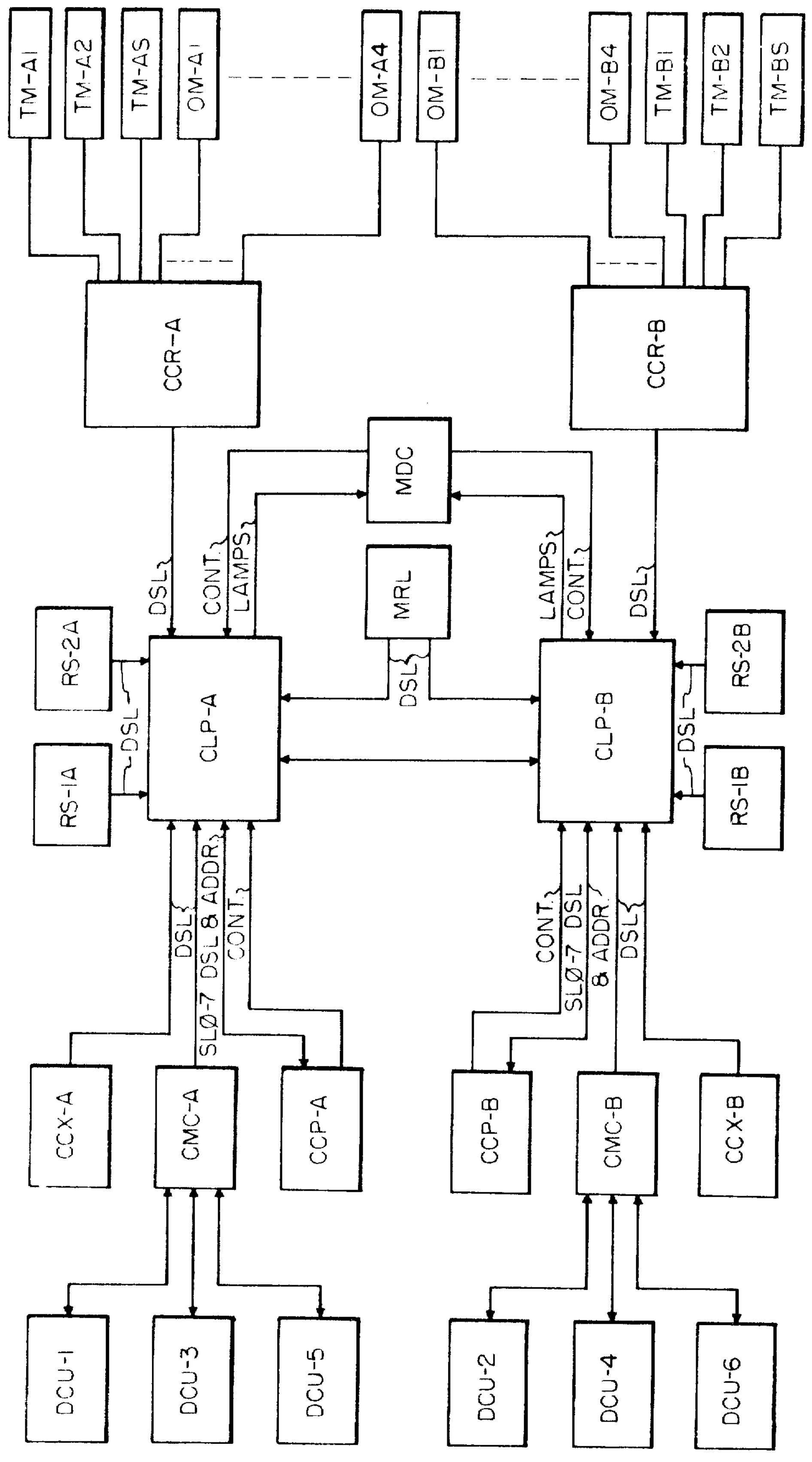
FIG. 7 is a block diagram showing how the computer line processor of FIG. 4 interfaces with other subsystems of a communication switching system.
Figure 8:
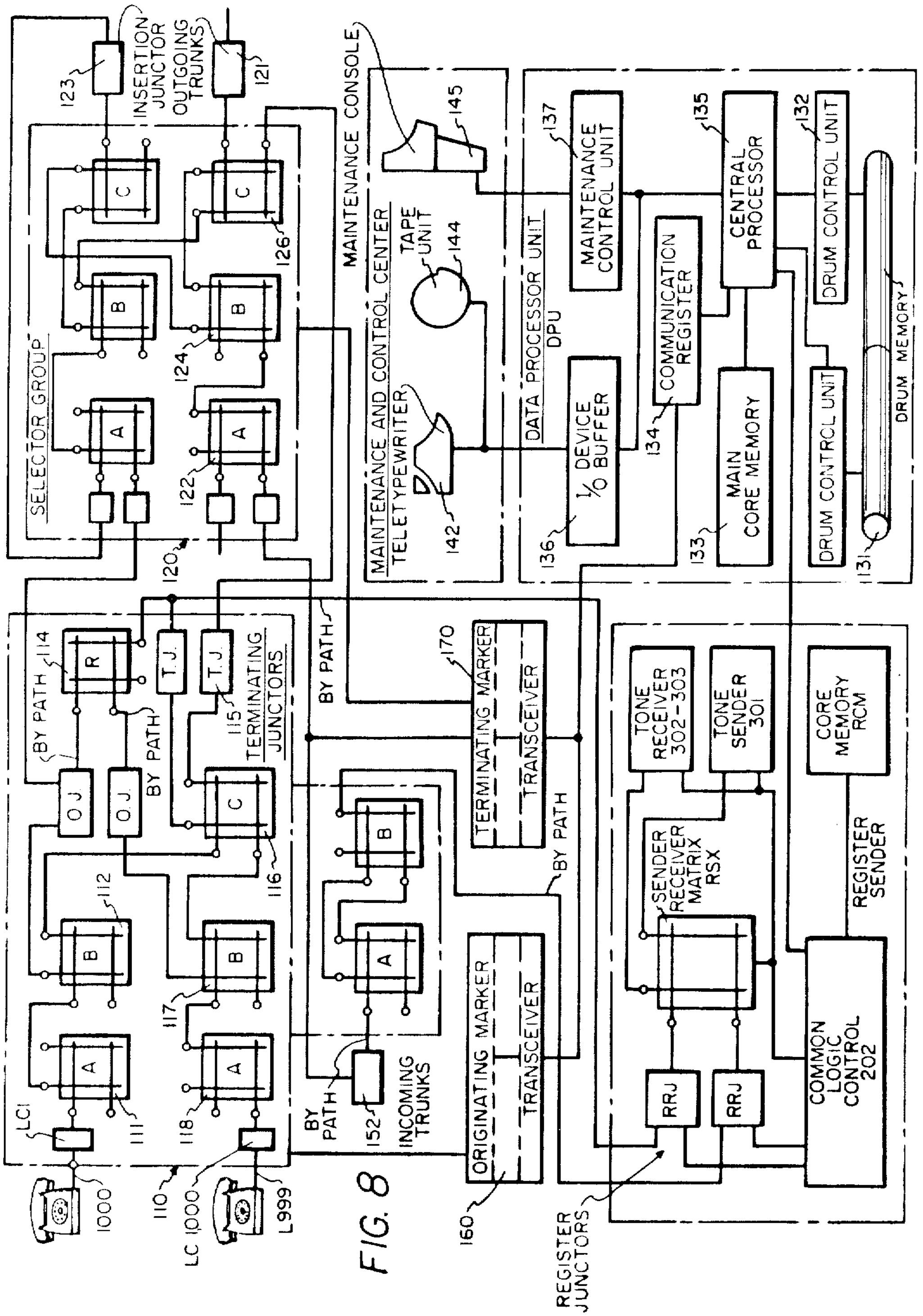
FIG. 8 is a block diagram of the communication switching system.

The interfaces of the computer line processor CLP with other units of a communication switching system is shown in FIG. 7, and a block diagram of the switching system is shown in FIG. 8. The system is described in said SYSTEM patent application. Note that the block designated "Central Processor" 135 in FIG. 8 comprises the duplicated computer central processor CCP and the duplicated computer line processor CLP. The correlation of FIGS. 7 and 8 is also explained in the SYSTEM application. Data sense lines DSL from various subsystems are cabled to the computer line processor CLP as shown in FIG. 7, with those from A units of duplicated subsystems to line processor CLP-A, and from B units to CLP-B. The sense lines from odd numbered drum control units DCU1, 3, 5 are channeled through the computer memory control CMC-A to CLP-A; and from even numbered units DMC2, 4, 6 via CMC-B to CLP-B. The sense lines from A markers are cabled via the communication register CCR-A to line processor CLP-A; while those from B markers are via CCR-B to CLP-B. The two register-senders RS-1A and RS-2A supply data sense lines to line processor CLP-A, while those from RS-1B and RS-2B are to CLP-B. The data sense lines from the computer channel multiplex CCX-A go to CLP-A, while those from CCX-B go to CLP-B. These data sense lines from the A and B subsystems are connected to the computer line synchronizers CLS-A and CLS-B respectively as shown in FIG. 4, while the central processor data sense lines by-pass the line synchronizers.

Computer Line Synchronizer

When the duplicated central processors are operating in synchronization, it is imperative that the data sense line signals from subsystems external to the central processors be available to them at exactly the same time. If one central processor were to receive an indicator, while the other did not, the possibility of them going out of synchronization would be very great. Since the external signals are asynchronous to the central processors, and the nature of the circuitry being such that each central processor would require a different propagation time, a synchronization of the indicators is required. This synchronization takes the form of temporary storage that holds the state of the indicator, whether it be true or false, for a period of 500 nanoseconds. This time is sufficient to allow for propagation differences between the two central processors.

Each of the computer line synchronizers CLS-A and CLS-B comprises 256 sync hold circuits, for a total of 512, and decode and control circuits. The decode and control circuits of CLS-A are shown in FIGS. 5 and 5A, while its sync hold circuits are shown in FIG. 5A.

The sync hold circuits SHC1-SHC256 each comprise a JK flip-flop and input gates. The clock pulse for synchronization is supplied from the control circuits on lead SYNC PULSE 1. Two controls signals SIG LOCKOUT 1 and TEST are normally at $\phi$ level and inverted enable NAND gates 551 and 552 respectively of sync hold circuit SHC1 and corresponding gates of the other sync hold circuits. A signal RESET may be used to reset all of the sync hold circuits. The data sense line signal inverted by gate 551 is connected to the K input, and inverted again to gate 552 to the J input.

If the signal SIGNAL LOCKOUT is true, then all of the data sense line signals are locked out, and the single pulsing of the signal SYNC PULSE 1 will set or reset all flip-flops depending on whether TEST was true or false.

A conditional OR function is used for the synchronization and the maintenance control signals. Corresponding signals from the two computer central processors CCP-A and CCP-B are cabled to the respective computer line processors CLP-A and CLP-B, and from the receivers the signals from each computer central processor is supplied to both CLS-A and CLS-B. A suffix 1 or A indicates a signal originating in CCP-A, and a suffix 2 or B indicates a signal originating in CCP-B.

If both computer central processors are on line the signals from the two are OR'ed together. If only one computer central processor is on line it controls both CLS-A and CLS-B. If both computer central processors are off line then CCP-A controls CLS-A and CCP-B controls CLS-B. The selection is accomplished with signals CCP ON LINE 1 and CCP ON LINE 2 via gates 529 and 530 whose outputs selectively enable gates for other signals.

The computer line synchronizer requires both error checking hardware and maintenance hardware. The error checking hardware is such that if it detects a fault that will bring down both CLS-A and CLS-B, it will lock out the effect of the fault so that the system is not brought down. Maintenance hardware is capable of thoroughly routining the entire computer line processor CLP via programmed instructions (CPD control pulse directives). Signals CPD CLP1 and 2 via gates 507 and 508 enable the gating of data bus bits received on leads DB$\phi$CPD1 to DB3CPD2 in accordance with the on line conditions, and these are decoded as sixteen states. Some of the decoded values are used only in CLS-A and others only in CLS-B as indicated by the letters to the left of the binary code of the outputs in the decode block 500.

The detection hardware will recognize the following faults. The signal IS SYNC (interrupt and sense line synchronication pulse) from each computer central processor CCP is commoned to both halves of the CLS. Where this signal is faulted true, the hardware of one of the CLS units would recognize the fact, set a storage element 541 SYNC ERR and lockout the faulted signals from both halves of the CLS. The storage element SYNC ERR1 is assigned to sense line $\phi$44$\phi$4 (octal value) and when true indicates that the IS SYNC or P1 signal from CCPB is faulted true. The storage element SYNC ERR 2 in CLS-B is assigned to sense line $\phi$441$\phi$ and when true indicates that the IS SYNC or P1 signal from CCPA is faulted true.

The signal Pulse 1 (P1) is used to detect the IS SYNC fault. If it should fault true the same events will occur as in the case of IS SYNC fault. Also, as a side effect, which is not predictable, another storage element 543 CLS CONT ERR may be set. The sense lines associated with this condition is $\phi$45$\phi\phi$ and $\phi$46$\phi\phi$.

The CPD instruction to the CLP is checked for a stuck-at-one condition. Should it occur a storage element 542 is set called CPD CLP ERR 1 and/or 2. The sense lines associated with these storage elements are $\phi$442$\phi$ and $\phi$444$\phi$ respectively. The offending signal will also be locked out of both halves of the CLS.

A fourth detection occurs where an IS SYNC signal does not function within a unit of the CLS. The signal may be faulted true or false. In either case the ability to monitor the external systems associated with that unit of the CLS has been lost. Should this case occur the storage elements 543 CLS CON ERR1 and 2 will be set.

The sense lines associated with these storage elements are $\phi$45$\phi\phi$ and $\phi$46$\phi\phi$. No other action is taken.

These faults having been processed by the detection hardware are now considered latent and are to be recognized within a scheduled routine period. They are considered latent because the system is not down without them.

Faults in the duplicated CSL and CPI systems will be instantly recognized with their use. Routining in worst cases will uncover faults before the circuits are needed.

Routining involves the use of the CPD instruction. With proper directives all external signals can be locked out of the CLP system (CPD $\phi$1, $\phi$). All Sense lines associated with external signals can be simulated true (CPD$\phi$1, $\phi$2) or false (CPD$\phi$1, $\phi$3) and their action monitored via the instructions SSNT or LSCA. The Interrupted system can also be routined using these CPD(s).

The CPD instructions also simulate an IS SYNC signal stuck true (CPD $\phi$1, $\phi$1$\phi$ from CCPA) (CPD $\phi$1, $\phi$11 from CCPB).

A P1 signal stuck true (CPD $\phi$1, $\phi$12 from CCPA) (CPD $\phi$1, $\phi$13 from CCPB).

A CPD CLP signal stuck true (CPD $\phi$1, $\phi$14 from CCPA) (CPD $\phi$1, $\phi$15 from CCPB). and the failure of a IS sync signal within a CLS power module (CPD $\phi$1, $\phi\phi$6 in unit "A") (CPD $\phi$1, $\phi\phi$7 in unit B).

The decoding hardware that selects the group of sense lines to be monitored is broken into two parts. One part selects groups 2 through $\theta$ (IR bits $\theta$, 10 and 11) while the other selects the particular card that contains the groups (IR bits 8, 12 thru 14). A CPD instruction CPD $\phi$1, $\phi$16 places the output of the group decode on to 7 sense lines where they can be programmed check for a 1 out of $n$ condition.

The eight sense line of the group contains the coded output of the 9th card.

The instruction CPD $\phi$1, $\phi$17 places the first 8 outputs of the decoder of IR bits 8, 12, 13, and 14 onto the sense lines, thus, they too can be given a programmed 1 out of *n* check.

The sync hold circuit 224, instead of having an external data sense line, has its input from the 0 side of its own output. This output designated OSG (oscillating sync gate) is exclusive-or compared at gates 545, 546 and 547 with the corresponding outputs of CLS-B to detect an out of sync condition and set latch 543.

The real time clock circuit 560 is also implemented within the CLP frame. It was placed in the CLS mnemonic since its output goes only there. It is duplicated in that a main real time clock resides in the A unit of CLS while a stand by real time clock resides in the B unit. The main real time clock is triggered by commercial AC while the stand-by is triggered by converted AC from the drum control power. Although both are continuously being triggered the standby real time clock remains passive until the main real time clock faults or is being manually routined. The output of the sync hold circuit that syncs up the real time clocks are distributed to both sense lines circuits and both priority interrupt circuits. The handling of real time computation is under program control software.

Computer Sense Line Circuit

Referring to FIG. 6, the computer sense line circuit CSL comprises up to 16 group sense cards, eight sense line merge gate circuits, and control circuits.

Each group sense card comprises OR function gate circuits represented as gates 601–608. Each of the OR gates has eight inputs from AND gates such as 611–618 to gate 601. These eight AND gates have respective enabling inputs from the eight leads GROUP 1 - GROUP 8. Each of the leads GROUP 1 – GROUP 8 is thus connected to eight AND gates of each of the 16 group sense cards. The other input of each AND gate is a unique sense line. There are a maximum of 1024 of these sense lines, designated in FIG. 6 as SL111–SL1688, with digits designating card 1–16, group 1–8 and individual number 1–8. The sense line input of each card is connected to ground potential for routining purposes.

The merge circuits are represented as eight OR gates 621–628, each having 16 inputs, with an AND gate output connected to each input. The AND gates for each merge OR gate, such as gates 631–646 to gate 621, have enabling inputs from leads CARD1-CARD16 respectively. Thus when a card is selected its eight outputs are gated respectively to the eight merge gates; for example the signal on lead CARD 1 gates the eight outputs SL1C1–CL8C1 of group sense card 1 to the eight gates 621–628. The outputs of the merge gates are coupled via exclusive-or gate circuits 651–658 to the eight leads SL$\phi$–SL7.

As explained in the SYSTEM patent application, section 1.5 of Computer User Manual, there are two computer instructions LSGA and SSNT for use with the sense line field. Each of these instructions has the following format Bits $\phi$–7 Sense line field
8–14 Group field
15–20 OP code field
21–23 Tag The bits $\phi$–7 of the sense line field correspond to the eight sense leads SL$\phi$–SL7 which are cabled to the computer central processor CCP and gated via its data bus for these instructions. The group field bits are cabled from the instruction register outputs IR8–IR14 to the decode circuits 661 and 662 to select one output of each. The OP code field, in addition to its use in the computer central processor, is also cabled from instruction register outputs IR15–IR20 to a gate 663 for decoding the instruction SSNT, designated here as SSNTS. This signal to the exclusive-or gates 651–658 has the effect of inverting the sense line signals to leads SL$\phi$-SL7.

The tag field is for indexing and indirect addressing.

The signals GATE GROUPS and GATE CARDS to the decoders 661 and 662 from the computer line synchronizer CLS, FIG. 5, are used to selectively enable the decoder outputs for routining, as explained in the SYSTEM application.

Computer Line Processor Interconnections

Referring again to FIG. 4, note that all of the sense lines are connected to the computer sense line circuit CSL, while only selected sense lines for interrupt service are connected to the computer priority interrupt CPI. The sense line outputs of the sync hold circuits of each of the computer line synchronizers are CLS-A and CLS-B connected as inputs to both of the computer sense line circuit CSL-A and CSL-B and as selected to the computer priority interrupt units CPI-A and CPI-B; while sense lines originating from the computer central processors CCP-A and CCP-B as well as those originating with the computer line processors CLP-A and CLP-B, are not connected to the computer line synchronizer CLS, and are connected only to their own CSL and CPI units.

Computer Central Processor

Figure 9:
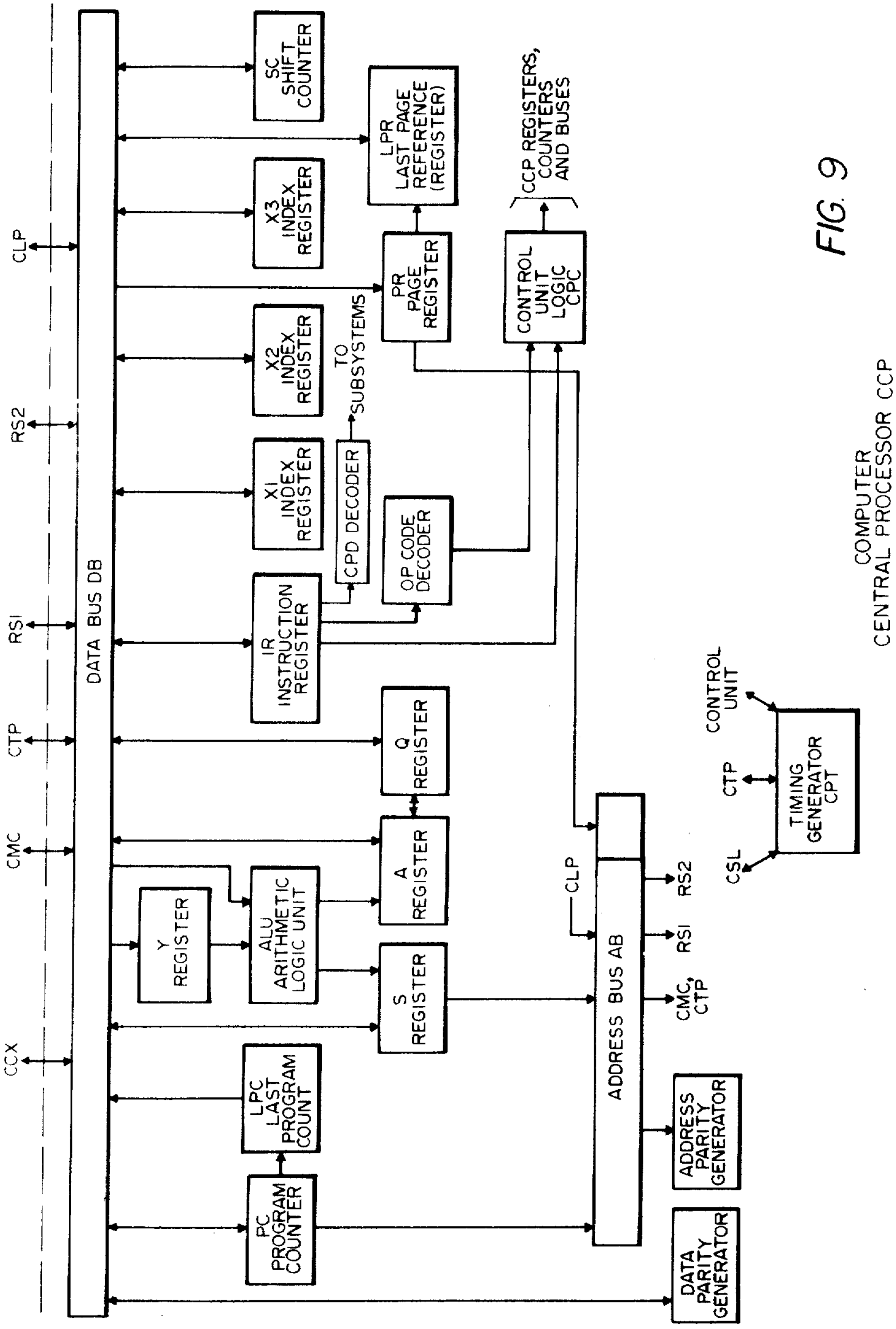
FIG. 9 is a block diagram of the computer central processor.
Figure 10:
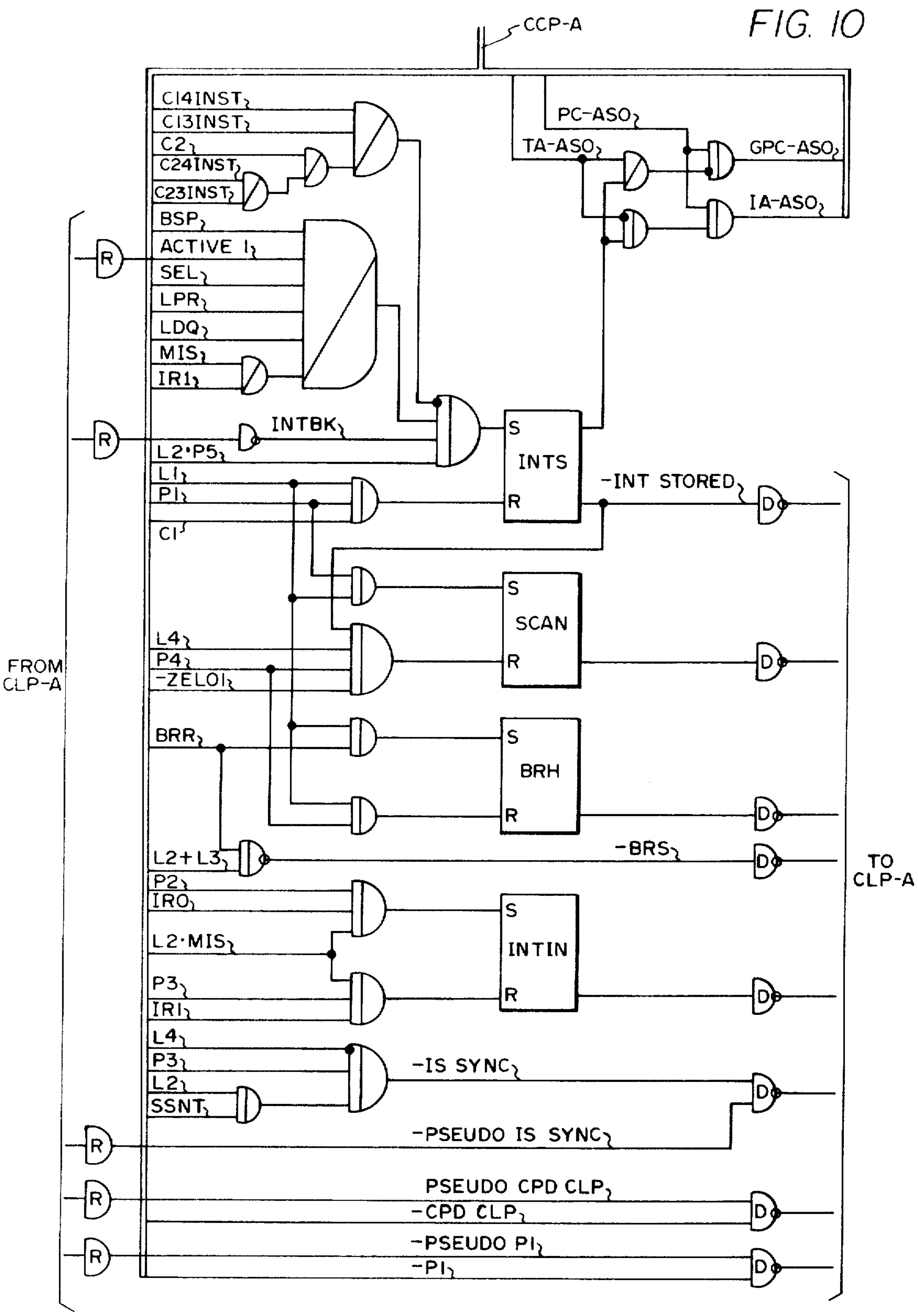
FIG. 10 is a function block diagram of some details of the computer central processor interfacing with the computer line processor.

The computer central processor CCP-A is shown in block diagram in FIG. 9. This diagram as well as detail drawings are explained in the SYSTEM patent application. Some details of the computer central processor interfacing with the computer line processor, in particular those relating to interrupts, are shown in FIG. 10. The cable drivers D are special NAND gates with two inputs (only one usually being used and shown), so that with inverted signals as inputs an OR function is obtained.

The signals BSP, BRR, LPR, LDQ, MIS, SEL, and SSNT are instruction OP codes. The timing generator of CCP supplies five pulse signals P1–P5 of 100 nanoseconds duration, four level signals L1–L4 each level being one cycle of pulses or 500 nanoseconds, and up to three cycle signals C1–C3 each cycle being one cycle of levels or 2 microseconds.

Refer to the SYSTEM patent application for further description of the computer central processor and its use in the system, in particular the part entitled "Computer User Manual" section 1.2 on the instruction set, section 1.5 on priority interrupt and sense line system, section 7 on the computer line synchronizer, and section 8.3 on sense line assignments.

We claim:

1. In a data processing system having a computer central processor and a plurality of other subsystems having data sense lines for signaling the computer central processor to request service or supply other data;

an interrupt block circuit comprising a plurality of interrupt stations organized into M blocks, each block having N stations, with each station assigned an interrupt priority level, the N highest levels being assigned to the stations of the first block, the next N levels to the stations of the second block, and so forth;

interrupt input means coupling said data sense lines to individual interrupt input leads of the respective stations for interrupt input signals;

each station having an input scan lead, an output scan lead, an interrupt output lead, means normally coupling the input scan lead to the output scan lead to propagate scan signals through the station, a "wait" bistable device and means to set it responsive to a signal on the interrupt input lead in coincidence with absence of a scan signal on the input scan lead, inhibit means responsive to an interrupt signal at the interrupt input lead and the next occurrence of a scan signal at the scan input lead to inhibit propagation of the scan signal to the output scan lead, said inhibit means being operative responsive to the "wait" device being set;

a common scan lead connected to the input scan lead of the first station of every block, each of the other stations having its input scan lead connected to the output scan lead of the preceding station, means to supply a scan signal to the common scan lead so that it propagates through all blocks in parallel and sequentially through the stations of each block unless it is inhibited by said inhibit means at a station because of an interrupt signal;

block scan means comprising a block scan device associated individually with the output of the last station of each block, each block scan device having a block scan output lead connected as a block scan input to each station and the block scan device of the next block, with the block scan input of the block scan device and stations of the first block normally enabled, block enabling means responsive to a scan signal having propagated through all stations of a block to enable its block scan device so that a block scan signal at its block scan input propagates to its block scan output, whereby a block scan signal propagates through the block scan devices of the blocks in sequence until it reaches a block having an interrupt condition at one of its stations;

and means effective at a station which has inhibited propagation of the scan signal, and responsive to the block scan signal at its block scan input to supply an interrupt output signal to the interrupt output lead of that station.

2. In a data processing system, the combination as claimed in claim 1, further including address means coupled to the interrupt output leads of all stations to encode an address on leads to the computer central processor identifying interrupt output lead on which an interrupt output signal occurs, and means to supply a signal on an interrupt break lead to the computer central processor responsive to a signal on any one of the interrupt output leads.

3. In a data processing system, the combination as claimed in claim 2, wherein each of said stations includes an "active" bistable device:

wherein there is common interrupt storage means with input gating to set it responsive to said interrupt break signal and timing information, means responsive to coincidence of an output of the interrupt storage means indicating interrupt stored, a block scan signal on the block scan input of a block, the "wait" device of a station in that block being set, and the scan signal on the scan input lead of the last said station to set the "active" device of that station;

means responsive to the "active" device being set to reset the "wait" device, and wherein the means to inhibit propagation of the scan signal is operative responsive to the "active" device being set.

4. In a data processing system, the combination as claimed in claim 3, further including branch return scan means, which for each station comprises a gate between a branch return input lead and a branch return output lead to normally propagate branch return scan signals, and each station includes an "auxiliary" bistable device with an output connected to the last said gate to inhibit propagation of the branch return scan signals when it is set, and means to set the "auxiliary" device responsive to the active device being set;

a common branch return scan lead connected to the branch return input lead of the first station of every block, each of the other stations having its branch return input lead connected to the branch return output lead of the preceding station, means responsive to a branch return reset instruction in the computer central processor to supply a branch return scan signal to the common branch return scan lead so that it propagates through all blocks in parallel and sequentially through the stations of each block unless it is inhibited at a station because of the "auxiliary" device being set;

block branch return scan means including means associated with the last station of each block coupled to a block branch return input lead connected to each station of the next block, and means responsive to a branch return scan signal having propagated through all stations of a block to enable the block branch return scan means so that the branch return scan signal propagates through the block branch return scan means of successive blocks until it reaches a block having the auxiliary device set at one of its stations;

and means effective at the station having coincidence of the branch return scan signal condition at its branch return input lead and its block branch return input lead to reset the "active" device.

5. In a data processing system, the combination as claimed in claim 4, wherein common scan input gate means have input connections from a scan signal source and a branch return reset source and output connections to said common scan lead and said common branch return scan lead which responsive to a signal from the scan signal source supplies a scan signal to the common scan lead if there is no signal branch return reset source and alternatively to the common branch return scan lead if there is a signal from branch return reset source;

and gate means at each station having an output connected to reset the "auxiliary" device and input connections from its input scan lead and a common branch return hold lead coupled to an output of a bistable device which is set in response to the branch return instruction and timing signals and reset in response to timing signals during an instruction cycle.

6. In a data processing system, the combination as claimed in claim 3, wherein the means to inhibit propagation of the scan signal is operative responsive to the "active" device of the next station being set.

7. In a data processing system, the combination as claimed in claim 2, wherein each interrupt lead may have a plurality of data sense lines assigned thereto, and interrupt merge means coupling the data sense lines to the interrupt input leads to which they are assigned;

lockout means individual to each data sense line assigned for interrupt including a lockout bistable device which is set in response to the "wait" device of its interrupt station being set; and a gate having an input from the data sense line, an output to the interrupt merge means and an input from the lockout device to inhibit the gate, and a reset connection from the data sense line to the lockout device to reset it when there is no signal on the data sense line; whereby once a signal on a data sense line has appeared and the interrupt station has responded thereto, the signal will not produce another response until it has been removed and reapplied.

8. In a data processing system, the combination as claimed in claim 2, wherein said data sense lines are connected to group selection and merge gating means, group decode means having inputs from an instruction register of the computer central processor which responsive to given sense line instructions identify a sense line group, outputs from the group decode means to enable the group selection and merge gating means so that sense lines of a selected group are coupled to computer input sense lines.

9. In a data processing system, the combination as claimed in claim 8, wherein each interrupt input lead may have a plurality of data sense lines assigned thereto, and interrupt merge means coupling the data sense lines to the interrupt input leads to which they are assigned.

10. In a data processing system, the combination as claimed in claim 9, wherein the computer central processor includes means using said sense line instructions and the group selection and merge gating means to select the particular one of the data sense lines which has a signal thereon after an interrupt break signal.

11. In a data processing system, the combination as claimed in claim 10, wherein the data processing system has duplicated subsystems and duplicated computer central processors, further including synchronization hold circuits for the data sense lines from the subsystems, with means to synchronize the signals the data sense line inputs of duplicated interrupt circuits and to duplicated group selection and merge gating means.

12. In a data processing system, the combination as claimed in claim 11, including means to derive signals on a synchronization pulse lead to the synchronization hold circuits in accordance with timing signals from both of the computer central processors depending on the on or off line condition of each.

13. In a data processing system, the combination as claimed in claim 12, further including maintenance circuits operative responsive to control pulse directives from the computer central processor for checking the synchronization hold circuits, for checking the paths supplying signals to synchronization pulse lead, for checking the group selection and merge gating means, and for checking other circuits.

14. In a data processing system, the combination as claimed in claim 11, wherein common scan input gate means have input connections from a scan signal source and a branch return reset source and output connections to said common scan lead and said common branch return scan lead which responsive to a signal from the scan signal source supplies a scan signal to the common scan lead if there is no signal branch return reset source and alternatively to the common branch return scan lead if there is a signal from branch return reset source;

and gate means at each station having an output connected to reset the "auxiliary" device and input connections from its input scan lead and a common branch return hold lead coupled to an output of a bistable device which is set in response to the branch return instruction and timing signals and reset in response to timing signals during an instruction cycle.

15. In a data processing system, the combination as claimed in claim 14, wherein the means to inhibit propagation of the scan signal is operative responsive to the "active" device of the next station being set.

16. In a data processing system, the combination as claimed in claim 15, wherein each interrupt lead may have a plurality of data sense lines assigned thereto, and interrupt merge means coupling the data sense lines to the interrupt input leads to which they are assigned;

lockout means individual to each data sense line assigned for interrupt including a lockout bistable device which is set in response to the "wait" device of its interrupt station being set; and a gate having an input from the data sense line, an output to the interrupt merge means and an input from the lockout device to inhibit the gate, and a reset connection from the data sense line to the lockout device to reset it when there is no signal on the data sense line; whereby once a signal on a data sense line has appeared and the interrupt station has responded thereto, the signal will not produce another response until it has been removed and reapplied.

17. In a data processing system, the combination as claimed in claim 8, wherein the data processing system has duplicated subsystems and duplicated computer central processors, further including synchronization hold circuits for the data sense lines from the subsystems, with means to synchronize the signals to the data sense line inputs of duplicated interrupt circuits and to duplicated group selection and merge gating means.

18. In a data processing system, the combination as claimed in claim 1, further including means responsive to a given instruction in the computer central processor to inhibit the signal on the block scan input of the block scan device and stations of the first block, thereby preventing propagation of the block scan signal to all other blocks, which inhibits all stations from supplying an interrupt signal to their interrupt output lead to inhibit all interrupts.

* * * * *